EST AVAILABLE COPY

April 21, 1959 | P. I. BOWMAN | Des.-Re. 24,635

GUN

Orig. 180,389

Original Filed Sept. 2, 1955

2 Sheets-Sheet 1

INVENTOR.
PHILIP I. BOWMAN

BY John P. Murphy
ATTORNEY

BEST AVAILABLE COPY
AVAILABLE COPY

April 21, 1959 P. I. BOWMAN Des.-Re. 24,635
GUN
Original Filed Sept. 2, 1955 2 Sheets-Sheet 2

INVENTOR
PHILIP I. BOWMAN
BY
John P. Murphy
ATTORNEY

BEST AVAILABLE COPY

United States Patent Office

Des. Re. 24,635
Reissued Apr. 21, 1959

24,635

GUN

Philip L. Bowman, Syracuse, N.Y.

Original No. 180,389, dated June 4, 1957, Serial No. 37,755, September 2, 1955, for 14 years. Application for reissue July 17, 1957, Serial No. 46,991. Term of patent 14 years (Cl. D30—1)

Matter enclosed in heavy brackets [ ] appears in the original patent but forms no part of this reissue specification; matter printed in italics indicates the additions made by reissue.

Figure 1:
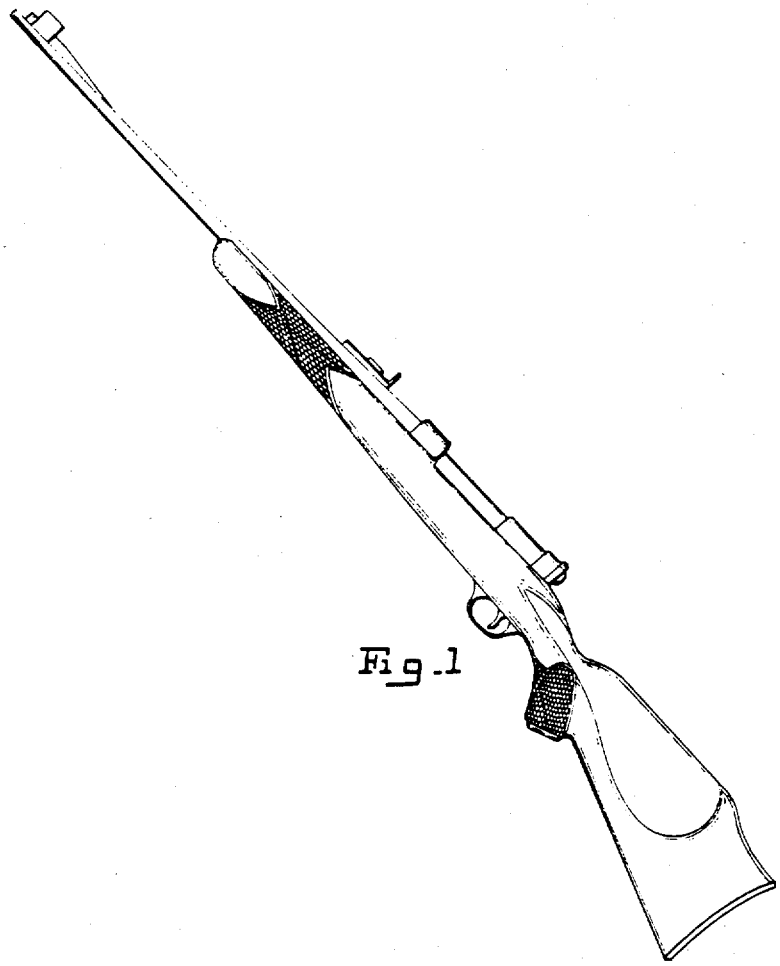

*Figure 1* [The figure] is a side elevational view of a gun, embodying my new design.

[The opposite side of the gun is the same as the side shown.]

Figure 2:
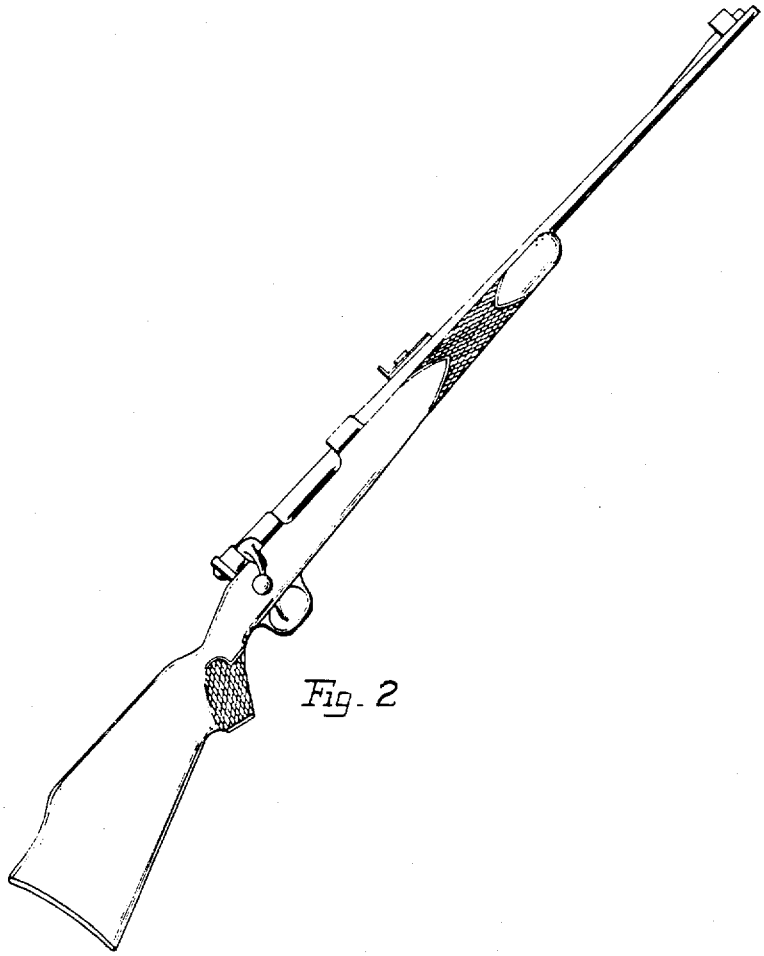

*Figure 2 is a side elevational view of the opposite side of said gun.*

I claim:

The ornamental design for a gun, as shown [and described].

References Cited in the file of this patent or the original patent

UNITED STATES PATENTS

| | | |
|---|---|---|
| 1,768,373 | Powell | June 24, 1930 |
| 2,331,372 | Buchanan | Oct. 12, 1943 |
| 2,673,414 | Arnold | Mar. 30, 1954 |

OTHER REFERENCES

The American Rifleman, May 1949, gun at top of page 10.

The Shooter's Bible, No. 41, 1950, Stoeger Arms Corp., top of page 35.

The Shooter's Bible, No. 44, 1953, Stoeger Arms Corp., page 38, Winchester Model 70 (Super Grade) and Model 70 (375H&H Magnum).